(12) United States Patent
Maruyama et al.

(10) Patent No.: US 7,806,675 B2
(45) Date of Patent: Oct. 5, 2010

(54) INJECTION MOLDING MACHINE WITH RESIN PRESSURE GRADIENT DETECTION

(75) Inventors: Junpei Maruyama, Yamanashi (JP); Shingo Komiya, Yamanashi (JP)

(73) Assignee: Fanuc Ltd (JP)

( * ) Notice: Subject to any disclaimer, the term of this patent is extended or adjusted under 35 U.S.C. 154(b) by 211 days.

(21) Appl. No.: 12/130,066

(22) Filed: May 30, 2008

(65) Prior Publication Data

US 2008/0305200 A1    Dec. 11, 2008

(30) Foreign Application Priority Data

Jun. 11, 2007   (JP) ............................... 2007-153812

(51) Int. Cl.
   B29C 45/77   (2006.01)
(52) U.S. Cl. .................. 425/145; 425/149; 425/150
(58) Field of Classification Search ................ 425/145, 425/149, 150
   See application file for complete search history.

(56) References Cited

U.S. PATENT DOCUMENTS

| 4,902,455 A | * | 2/1990 | Wobbe ........................ 425/145 |
| 7,654,810 B2 | * | 2/2010 | Maruyama et al. .......... 425/149 |

FOREIGN PATENT DOCUMENTS

| EP | 0 216 939 A1 | 4/1987 |
| JP | 63-124115 U | 8/1988 |
| JP | 01-148526 A | 6/1989 |
| JP | 02-204017 A | 8/1990 |
| JP | 4-37322 U | 3/1992 |
| JP | 06-071705 A | 3/1994 |
| JP | 2002370262 A | 12/2002 |
| JP | 2005035132 A | 2/2005 |

OTHER PUBLICATIONS

EP Search Report for 08104204.6 dated Sep. 16, 2008.

* cited by examiner

*Primary Examiner*—Tim Heitbrink
(74) *Attorney, Agent, or Firm*—Lowe Hauptman Ham & Berner, LLP

(57) ABSTRACT

Suck back is started and a gradient of pressure (an amount of change in resin pressure while a screw or a plunger moves backward by a certain amount) is detected. Whether or not an absolute value of the detected gradient of the pressure is smaller than a reference value set in advance is determined, and it is determined that the reduction of the resin pressure has been completed when the absolute value becomes smaller than the reference value. A screw position at the time of the completion of the pressure reduction is stored and a screw movement amount from a suck back start position to a pressure reduction completion position is displayed on a screen.

6 Claims, 6 Drawing Sheets

INJECTION MOLDING MACHINE WITH RESIN PRESSURE GRADIENT DETECTION

BACKGROUND OF THE INVENTION

1. Field of the Invention

The present invention relates to an injection molding machine such as an in-line screw type injection molding machine and a pre-plasticization type injection molding machine and particularly to an injection molding machine in which completion of reduction of resin pressure in suck back control and completion of reduction of resin pressure by reverse rotation of a screw can be detected with accuracy.

2. Description of the Related Art

Injection molding can be divided into a process of injecting resin into a metal mold by moving a screw forward and forming a molded article by pressure holding and a process of moving the screw backward while rotating it at predetermined back pressure to meter a predetermined amount of resin into a cylinder. Because resin pressure has been developed after the end of the metering process, there is a process (referred to as a suck back process) of moving the screw backward by a predetermined amount to reduce pressure of the resin in the cylinder to prevent leakage of the resin from a nozzle portion when the metal mold opens.

A purpose of the suck back process is to reduce the pressure in the cylinder as described above. If the screw moves backward excessively, air may be drawn in from the nozzle and, as a result, a problem of air bubbles mixed into the molded article may occur. Therefore, as an optimum amount (suck back amount) by which the screw is moved backward, it is preferable to choose such a position that the pressure in the cylinder is sufficiently reduced and that the screw does not move backward excessively.

For this purpose, conventionally, a method of setting an optimum screw movement amount while monitoring a relationship between the resin pressure and a position of the screw indicated on a screen of an injection molding machine is employed. Furthermore, a method of automatically moving the screw backward until the resin pressure reaches a predetermined value (normally zero atmospheric pressure in terms of gage pressure) is disclosed in the following Patent Documents. With regard to gage pressure, when atmospheric pressure or surrounding pressure is zero, pressure higher than that is referred to as positive gage pressure and pressure lower than that is referred to as negative gage pressure. Hereafter, pressure in this specification is gage pressure.

Japanese Utility Model Application Laid-open No. 63-124115

Japanese Patent Application Laid-open No. 1-148526

Japanese Patent Application Laid-open No. 2-204017

Japanese Utility Model Application Laid-open No. 4-37322

Japanese Patent Application Laid-open No. 6-71705

However, a zero point offset may occur in a sensor for detecting the resin pressure as the sensor is used successively. Therefore, actual resin pressure may not have been reduced completely though sensor pressure is zero or the actual resin pressure may have been reduced completely though the sensor pressure is not zero. Moreover, to calibrate the sensor to correct the zero point, continuous molding normally need be stopped temporarily, which makes it difficult to constantly keep an accurate zero point of the sensor.

In general, for detection of the resin pressure, a method of detecting a load on the screw from the resin by using a load converter (load cell) is employed in many cases. However, the load that the screw receives includes not only reaction force from compressed molten resin in front of the screw but also viscosity resistance of semi-molten resin at a base of the screw. Therefore, the pressure detected by using the load converter (load cell) includes error due to the viscosity resistance of the resin and does not agree with the resin pressure even after accurate calibration.

As described above, it is difficult to accurately judge the completion of reduction of the pressure by the method of judging the completion of reduction of the pressure by comparing the value of the pressure sensor and the predetermined value (normally, zero atmospheric pressure).

SUMMARY OF THE INVENTION

Therefore, it is an object of the invention of the present application to accurately determine completion of reduction of resin pressure not affected by detection error of a pressure sensor in an injection molding machine.

In the injection molding machine according to a first aspect of the invention includes: an axial driving means for driving a screw or a plunger in an axial direction; a position detecting means for detecting an axial position of the screw or the plunger; and a resin pressure detecting means for detecting resin pressure, and carries out suck back control. The injection molding machine further includes: a resin pressure gradient detecting means for detecting a gradient of resin pressure related to the axial position of the screw or the plunger in the suck back control based on a position detection value from the position detecting means and a pressure detection value from the resin pressure detecting means; and a pressure reduction completion determining means for determining completion of reduction of the resin pressure by comparing an absolute value of the gradient of the pressure detected by the resin pressure gradient detecting means with a value set in advance.

The injection molding machine may further include a means for obtaining a movement amount of the screw or the plunger between a point of time of a start of the suck back and a point of time when the pressure reduction completion determining means determines the completion of the reduction of the resin pressure and for displaying the obtained movement amount on a screen.

In the injection molding machine according to a second aspect of the invention includes: a rotational driving means for driving a screw for rotation; a rotation amount detecting means for detecting a reverse rotation amount of the screw; and a resin pressure detecting means for detecting resin pressure, and carries out pressure reduction control by reverse rotation of the screw. The injection molding machine further includes: a resin pressure gradient detecting means for detecting a gradient of resin pressure related to the reverse rotation amount of the screw in the pressure reduction control based on a reverse rotation amount detection value from the rotation amount detecting means and a pressure detection value from the resin pressure detecting means; and a pressure reduction completion determining means for determining completion of reduction of the resin pressure by comparing an absolute value of the gradient of the resin pressure detected by the resin pressure gradient detecting means with a value set in advance.

The injection molding machine may further include a means for obtaining a reverse rotation amount of the screw between a point of time of a start of the pressure reduction control and a point of time when the pressure reduction completion determining means determines the completion of the reduction of the resin pressure and for displaying the obtained reverse rotation amount on a screen.

According to the invention, even if a zero point of pressure of the sensor includes an offset or even if a detection value of sensor pressure includes error due to viscosity resistance of resin, it is possible to accurately detect a point of time of completion of reduction of the resin pressure.

To carry out the suck back control by backward movement of the screw, the screw movement amount or the plunger movement amount at the completion of the pressure reduction is obtained and displayed on the screen. In this way, an operator can set an optimum suck back amount based on the movement amount displayed on the screen. Moreover, even if the optimum suck back amount is not set in advance, it is possible to automatically carry out optimum suck back control.

To carry out the pressure reduction control by the screw reverse rotation, the screw reverse rotation amount at the completion of the pressure reduction is obtained and displayed on the screen. In this way, the operator can set an optimum reverse rotation amount based on the reverse rotation amount displayed on the screen. Moreover, even if the optimum reverse rotation amount is not set in advance, it is possible to automatically carry out optimum pressure reduction control by reverse rotation of the screw.

BRIEF DESCRIPTION OF THE DRAWINGS

The above and other objects and features of the present invention will become apparent from the following description of the embodiment with reference to the accompanying drawings, wherein.

DETAILED DESCRIPTION OF THE PREFERRED EMBODIMENTS

Figure 1:
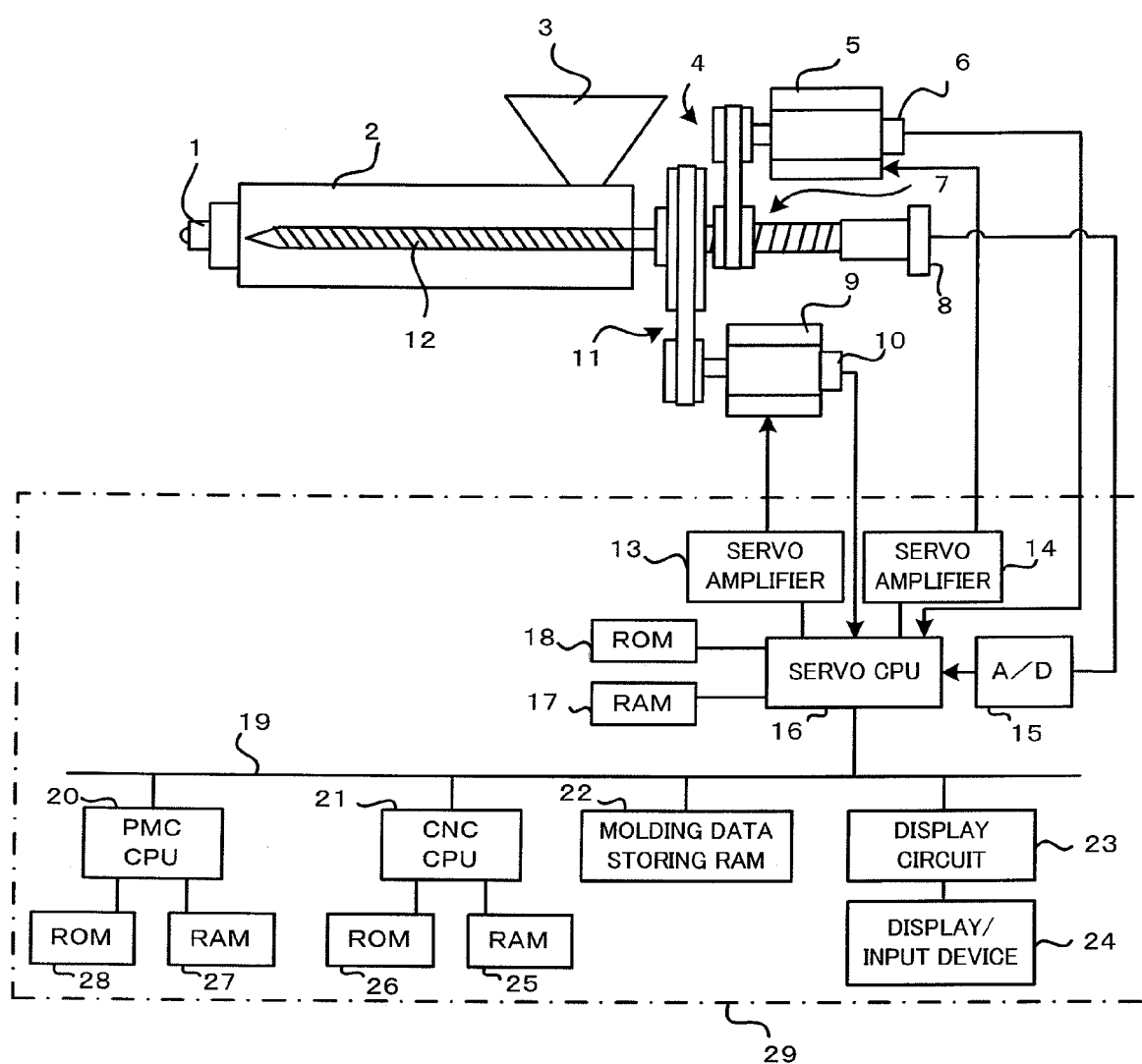
FIG. 1 is a block diagram of an essential portion of an injection molding machine that is an embodiment of the invention.

First, an embodiment of an injection molding machine according to the present invention is shown in a block diagram of an essential portion in FIG. 1.

A nozzle portion 1 is mounted to a tip end of an injection cylinder 2 into which a screw 12 is inserted and a hopper 3 for feeding resin pellets into the injection cylinder 2 is mounted to a rear end portion of the injection cylinder 2. The screw 12 is driven for rotation by a metering servomotor 9 through a power train 11. Moreover, the screw 12 is driven in an axial direction by an injection servomotor 5 through a conversion mechanism 7 for converting rotary motion of a power train 4 and a ball screw/a nut into linear motion so that injection and back pressure control are performed. The injection servomotor 5 and the metering servomotor 9 are respectively mounted with position/speed detectors 6, 10 for detecting their rotating positions/speeds. With the position/speed detectors 6, 10, rotating speed of the screw 12, a position of the screw 12 (an axial position of the screw), and moving speed (injecting speed) of the screw 12 can be detected.

A controller 29 for controlling the injection molding machine includes a CNC-CPU 21 that is a microprocessor for numerical control, a PMC-CPU 20 that is a microprocessor for a programmable machine controller, and a servo CPU 16 that is a microprocessor for servo control. By selecting mutual input and output via a bus 19, information can be transmitted between the respective microprocessors.

Connected to the servo CPU 16 are: a ROM 18 storing special control programs for servos and for performing processing of a position loop, a speed loop, and an electric current loop; and RAM 17 used for temporal storage of data. Servo CPU 16 is connected so that it can detect pressure signals via an A/D (analog/digital) converter 15 from a pressure sensor 8 provided to an injection molding machine main body to detect various types of pressure such as injection pressure. As the pressure sensor 8, a load converter (load cell) is used, for example.

Also respectively connected to servo CPU 16 are servo amplifiers 14, 13 for driving the injection servomotor 5 connected to an injection shaft and the metering servomotor 9 connected to a screw rotary shaft following a command from the servo CPU 16. To the servo CPU 16, outputs from position/speed detectors 6, 10 mounted to the respective servomotors 5, 9 are fed back. The rotating positions of the respective servomotors 5, 9 are calculated by the servo CPU 16 based on position feedback signals from the position/speed detectors 6, 10 to update and be stored in respective current position storage resisters.

FIG. 1 shows the servomotors 5, 9 for driving the injection shaft and the screw rotary shaft, the position/speed detectors 6, 10 for detecting the rotating positions/speeds of the servomotors 5, 9, and the servo amplifiers 14, 13. Though similar structures are provided to respective shafts such as a mold clamping shaft for carrying out clamping of a metal mold and an ejector shaft for taking a molded article out of the metal mold, these structures are not shown in FIG. 1.

Connected to the PMC-CPU 20 are: a ROM 28 for storing a sequence program or the like for controlling sequence operation of the injection molding machine; and RAM 27 used for temporal storage or the like of arithmetic data. Connected to the CNC-CPU 21 are: a ROM 26 for storing an automatic operation program for controlling the overall injection molding machine, a processing program for determining a point of time of completion of suck back, and the like, related to the invention; and RAM 25 used for temporal storage of the arithmetic data.

Molding data storing RAM 22 formed of nonvolatile memory is molding data storing memory for storing molding conditions, various set values, parameters, macro variables, and the like related to injection molding operation.

A manual data input device (display/input device) 24 having a display is connected to the bus 19 via a display circuit 23 and it is possible to carry out selection of a graph display screen and a function menu item, input operation of various data, and the like by using the device 24. As a display, a CRT, a liquid crystal display, or the like can be selected properly. The display circuit 23 is provided with an indicator (described later) for indicating the completion of the pressure reduction to further indicate a screw movement amount and a plunger movement amount from a start of suck back to the completion of the pressure reduction.

With the above structure, the PMC-CPU 20 carries out the sequence control of the overall injection molding machine and the CNC-CPU 21 distributes movement commands to the servomotors for the respective shafts based on the operation programs in the ROM 26 and the molding conditions and the like stored in the molding data storing RAM 22. The servo CPU 16 carries out servo controls such as position loop control, speed loop control, electric current loop control, and the like similarly to the prior art based on the movement commands distributed for the respective shafts, the feedback signals of positions and speeds detected by the position/speed detectors 6, 10, and the like, executes so-called digital servo processing, and controls driving of the servomotors 5, 9.

The above-described structure is not different from a controller of a prior-art electric injection molding machine and a means for determining that reduction of the resin pressure has been completed when an absolute value of an amount of change in the resin pressure becomes smaller than a predetermined value in the invention is formed of the controller 29 for controlling the injection molding machine.

Differences from the controller of the prior-art electric injection molding machine are that the ROM 26 stores a determination processing program for detecting the amount of change in the resin pressure during a certain amount of backward movement of the screw or the plunger when the screw or the plunger is moved backward in the suck back process to thereby obtain a gradient of the resin pressure and for determining the completion of reduction of the resin pressure when an absolute value of the obtained gradient of the resin pressure becomes smaller than a predetermined value and that the CNC-CPU 21 executes this determination processing program to form the injection molding machine for determining the completion of reduction of the resin pressure.

A principle of determination of the completion of reduction of the resin pressure according to the invention will be described by using FIGS. 2A to 3B.

Figure 2A:
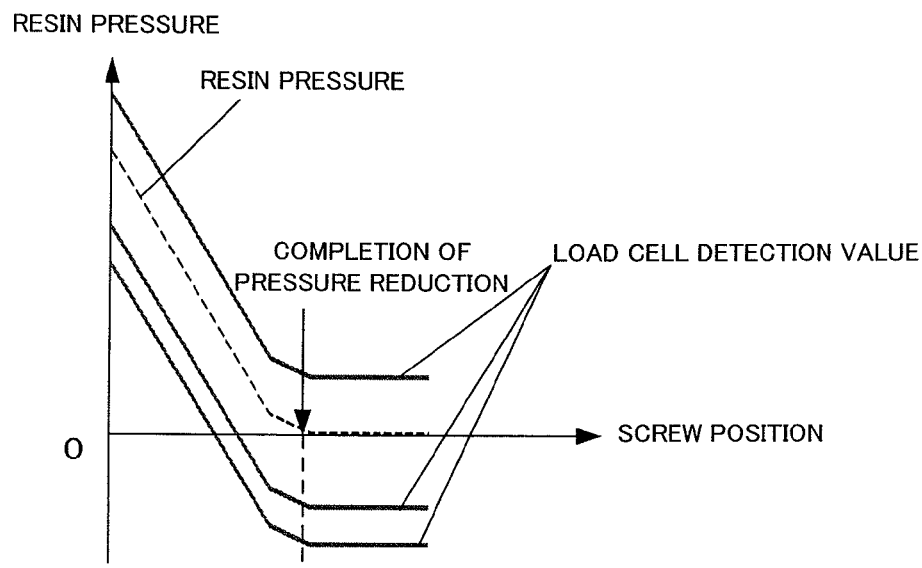
FIGS. 2A and 2B show an example of determination of a point of time of completion of pressure reduction based on Δ pressure/Δ screw position executed by the injection molding machine in FIG. 1.
Figure 2B:
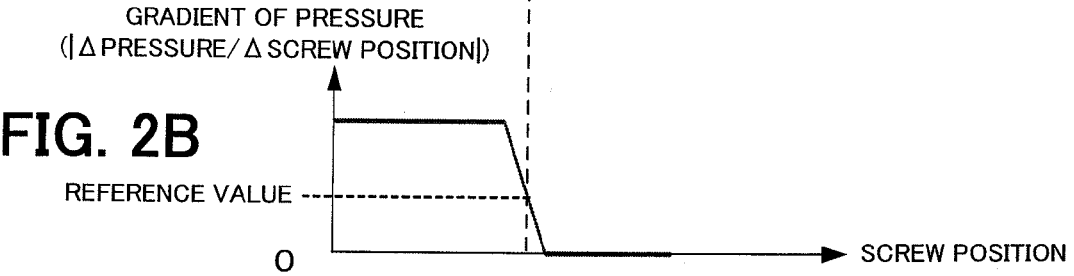
Figure 3A:
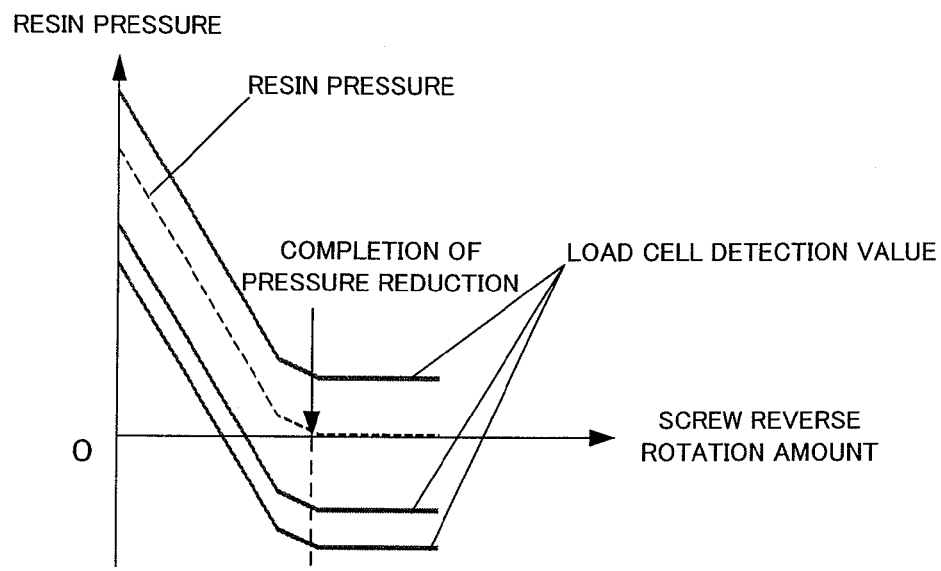
FIGS. 3A and 3B show an example of determination of a point of time of completion of pressure reduction based on Δ pressure/Δ screw reverse rotation amount executed by the injection molding machine in FIG. 1.
Figure 3B:
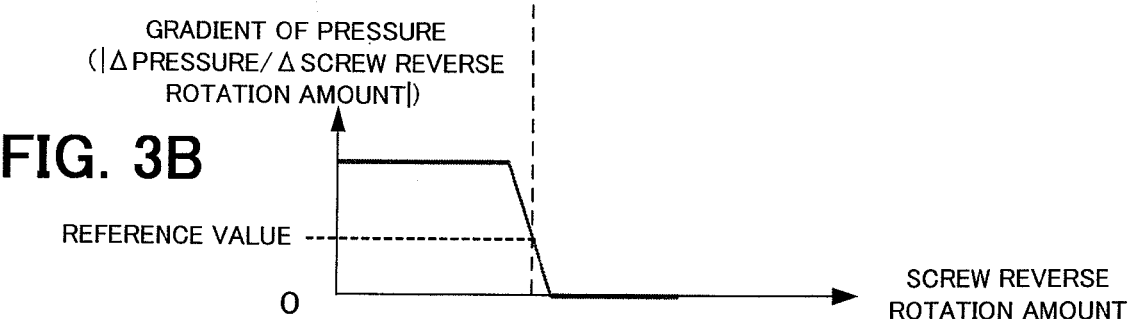

In the invention, so-called differential processing is performed by using a relationship between the screw position and the resin pressure in FIG. 2A or a relationship between the screw reverse rotation amount and the resin pressure shown in FIG. 3A, a rate of change in the resin pressure to the screw position shown in FIG. 2B or a rate of change in the resin pressure to the screw reverse rotation amount shown in FIG. 3B (hereafter these rates of change in the resin pressure will be referred to as "gradients of pressure"), and a point of time of the completion of the pressure reduction is determined based on the gradient of the pressure.

FIGS. 2A and 2B are explanatory drawings in a case of reducing the resin pressure by moving the screw backward.

In a graph in FIG. 2A, the horizontal axis represents the screw position and the vertical axis represents the resin pressure. The resin pressure indicated by a dotted line in FIG. 2A means true resin pressure. The resin pressure at zero screw position means pressure at the end of metering. Therefore, the resin pressure indicated by the dotted line at zero screw position is true pressure at the end of metering.

A zero point offset may occur due to change with time in the load converter (load cell) for detecting the resin pressure as the load converter is used successively. Therefore, a detection value of the load converter (load cell) may be a value obtained by shifting the true resin pressure in a plus or minus direction as shown in FIG. 2A. As a result, the detection value of the load converter (load cell) does not necessarily become zero when reduction of the resin pressure has been completed, thereby causing an offset error. Therefore, if the load cell detection value is compared with a value (reference value) set in advance to detect the completion of the pressure reduction based on a result of the comparison, accuracy of the detection is not always high.

Consequently, because the load cell detection value itself includes the error due to the offset, attention is focused on an amount of change ($\Delta$ pressure/$\Delta$ screw position) in the load cell detection value when the screw has been moved backward by a certain amount.

At the point of time of completion of metering, the metered molten resin has entered into the cylinder and been compressed by the screw at predetermined back pressure. From this state, if the screw is moved backward by the certain amount between the start of the pressure reduction process and the completion of reduction of the resin pressure, the resin pressure reduces by an amount corresponding to an increase in a volume of the compressed molten resin and, as a result, the load cell detection value also reduces. At this time, though the load cell detection value includes the offset error, the reduction amount in the resin pressure and a reduction amount in the load cell detection value agree with each other with accuracy.

Then, after the completion of reduction of the resin pressure, the molten resin is not compressed by the screw and therefore the resin pressure does not reduce and the load cell detection value does not reduce even if the screw is moved backward. At this time, because the reduction amount (amount of change) in the resin pressure and the reduction amount (amount of change) in the load cell detection value agree with each other, a point of time when reduction of the resin pressure stops and a point of time when reduction of the load cell pressure stops also agree with each other with accuracy.

From the above reason, it is possible to accurately detect the completion of reduction of the resin pressure based on the amount of change ($\Delta$ pressure/$\Delta$ screw position) of the load cell detection value when the screw is moved backward by the certain amount.

A graph in FIG. 2B shows a relationship between a step-like gradient of pressure ($\Delta$ pressure/$\Delta$ screw position) and the screw position obtained from the relationship between the screw position and the resin pressure shown in FIG. 2A. By using FIG. 2B, the screw position when the gradient of pressure shown in FIG. 2B becomes equal to a value (reference value) set in advance is determined to be a position of completion of the pressure reduction. The reference value is ideally zero but may be set to a value in a proper range including zero.

FIGS. 3A and 3B are explanatory views of a case in which the resin pressure is reduced not by moving the screw backward (FIGS. 2A and 2B) but by rotating the screw reversely.

In a graph in FIG. 3A, the horizontal axis represents a screw reverse rotation amount and the vertical axis represents resin pressure. The resin pressure indicated by a dotted line in FIG. 3A means true resin pressure. The resin pressure at zero screw reverse rotation amount means pressure at the end of metering. Therefore, the resin pressure indicated by the dotted line at zero screw reverse rotation amount is true pressure at the end of metering.

A zero point offset occurs due to change with time in the load converter (load cell) for detecting the resin pressure. Therefore, a detection value of the load converter (load cell) may be a value obtained by shifting the true resin pressure in a plus or minus direction as shown in FIG. 3A.

Therefore, attention is focused on an amount of change ($\Delta$ pressure/$\Delta$ screw reverse rotation amount) in the load cell detection value when the screw is rotated reversely by a certain amount.

At the point of time of completion of metering, the metered molten resin has entered into the cylinder and been compressed by the screw at predetermined back pressure. From this state, if the screw is rotated reversely by the certain amount between the start of the pressure reduction process and the completion of reduction of the resin pressure, the compressed molten resin moves to the back of the screw and therefore the load cell detection value also reduces. At this time, though the load cell detection value includes the error due to the offset, a reduction amount in the resin pressure and a reduction amount in the load cell detection value agree with each other with accuracy.

Then, after the completion of reduction of the resin pressure, the molten resin is not compressed by the screw and therefore the resin does not move to the back of the screw and the load cell detection value does not reduce even if the screw is rotated reversely. At this time, because the reduction amount in the resin pressure and the reduction amount in the load cell detection value agree with each other, a point of time when reduction of the resin pressure stops and a point of time when reduction of the load cell pressure stops also agree with each other with accuracy.

From the above reason, it is possible to accurately detect the completion of reduction of the resin pressure based on the amount of change ($\Delta$ pressure/$\Delta$ screw reverse rotation amount) of the load cell detection value when the screw is rotated reversely by the certain amount.

A graph in FIG. 3B shows a relationship between a step-like gradient of pressure ($\Delta$ pressure/$\Delta$ screw reverse rotation amount) and the screw reverse rotation amount obtained from the relationship between the screw reverse rotation amount and the resin pressure shown in FIG. 3A. By using FIG. 3B, the screw reverse rotation amount when the gradient of pressure shown in FIG. 3B becomes equal to a value (reference value) set in advance is determined to be a reverse rotation amount at the completion of the pressure reduction. The reference value is ideally zero but may be set to a value in a proper range including zero.

Figure 4:
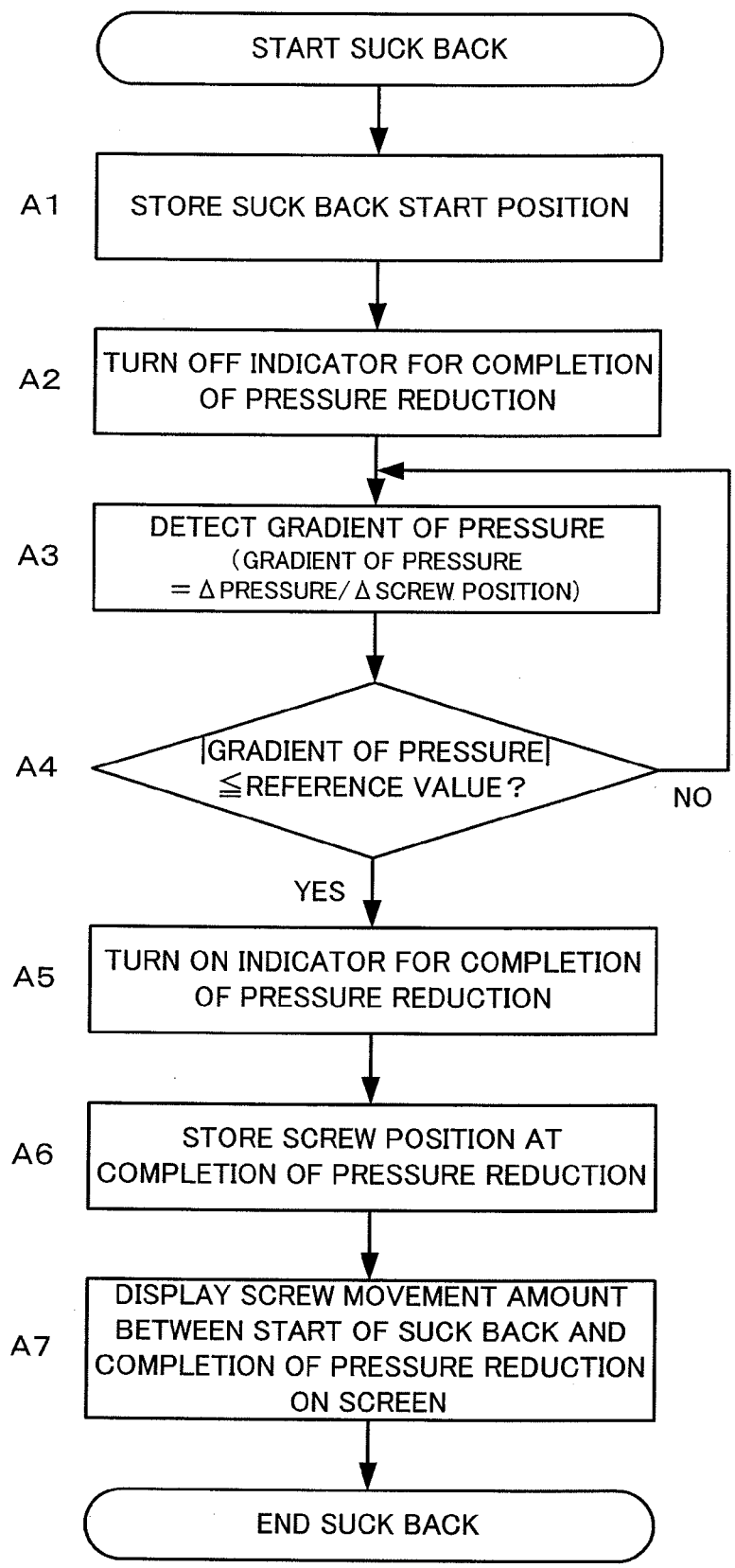
FIG. 4 is a flow chart of determination processing of an optimum pressure reducing distance based on Δ pressure/Δ screw position.
Figure 5:
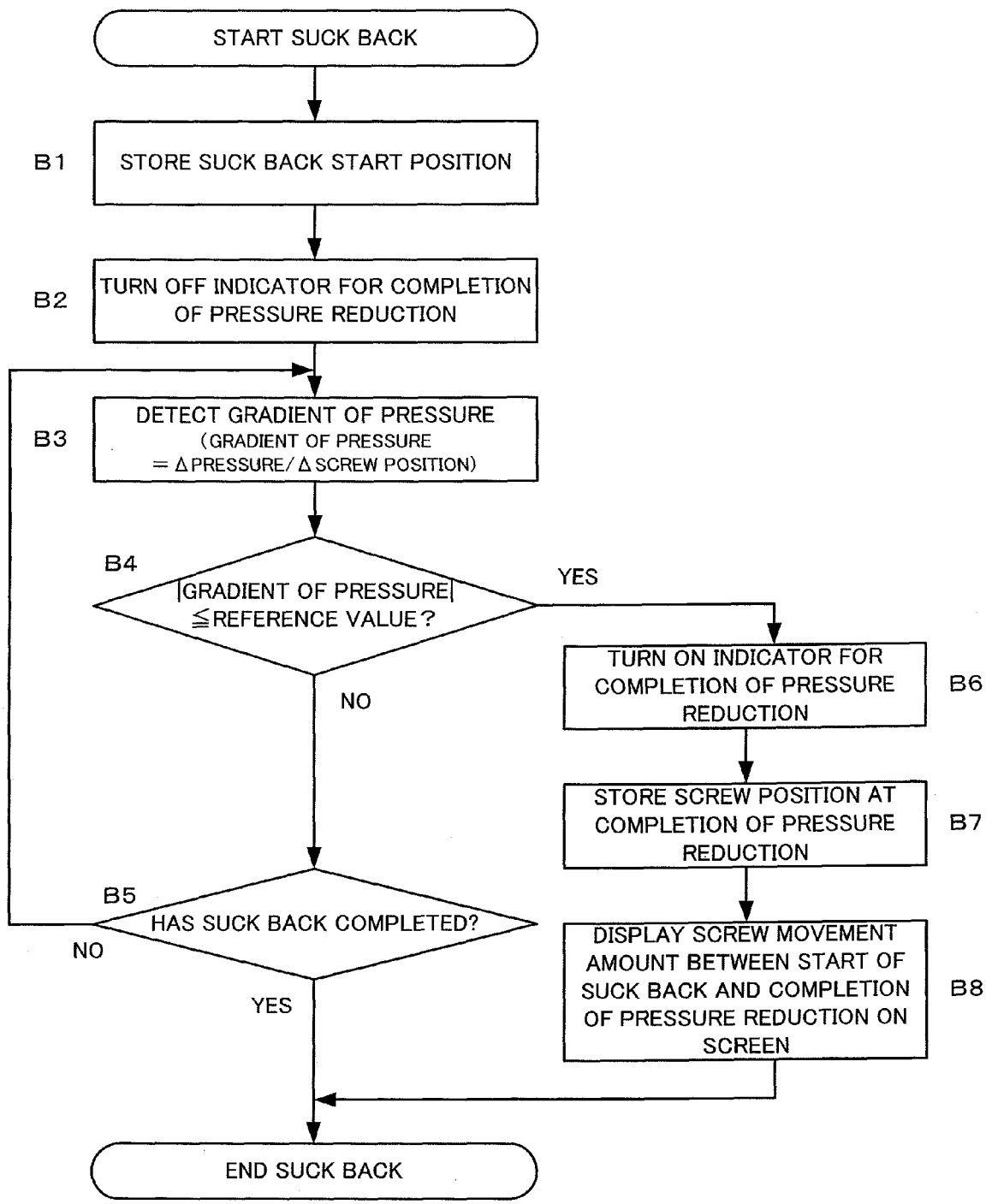
FIG. 5 is a flow chart showing an algorithm for carrying out determination of the optimum pressure reducing distance based on Δ pressure/Δ screw position when a suck back completion condition is set in advance.

FIGS. 4 and 5 are flow charts showing an algorithm for carrying out determination of an optimum pressure reducing distance in the suck back process using "$\Delta$ pressure/$\Delta$ screw position".

First, determination processing shown in the flow chart in FIG. 4 will be described. A suck back start position is stored (step A1) to start the suck back, and an indicator for indicating the completion of the pressure reduction is turned off (step A2). The gradient of pressure, i.e., "$\Delta$ pressure/$\Delta$ screw position" is obtained (step A3) and whether or not an absolute value of the obtained gradient of pressure is smaller than the value (reference value) set in advance is determined (step A4). If it is determined that the absolute value of the gradient of the pressure is not smaller than the reference value, the processing returns to step A3 to further continue movement of the screw, continue detection of the gradient of pressure and detect the gradient of the pressure.

Then, if it is determined that the absolute value of the gradient of pressure is smaller than the reference value in step A4, the indicator for indicating the completion of the pressure reduction is turned on (step A5) and a screw position at the time of the completion of the pressure reduction is stored as a pressure reduction completion position (step A6). Then, the screw movement amount from the suck back start position to the pressure reduction completion position is displayed on the screen (step A7) to finish the determination processing in FIG. 4.

By manually or automatically setting the "screw movement amount" displayed on the screen in step A7 as a suck back distance in the injection molding machine, suck back control can be carried out. As this "screw movement amount", it is also possible to use an average value of values obtained by measuring the screw movement amount a plurality of times, a movement average value, or the like.

FIG. 5 is a flow chart showing an algorithm for carrying out determination of the optimum pressure reducing distance by using "$\Delta$ pressure/$\Delta$ screw position" when a suck back completion condition is set in advance.

The determination processing shown in the flow chart in FIG. 5 will be described. The suck back start position is stored (step B1) to start the suck back, and the indicator indicating the completion of the pressure reduction is turned off (step B2). The gradient of the pressure, i.e., "$\Delta$ pressure/$\Delta$ screw position" is obtained (step B3) and whether or not an absolute value of the obtained gradient of the pressure is smaller than a value (reference value) set in advance is determined (step B4). If the absolute value of the gradient of the pressure is determined not to be smaller than the reference value, whether or not the suck back has been completed is determined (step B5). Here, whether or not the suck back has been completed is determined by using a value as a reference, which is set in advance based on the resin pressure detected by the pressure sensor or the screw movement amount (based on the screw position, based on the screw reverse rotation amount), for example. If it is determined that the suck back has not been completed yet, the processing returns to step B3 where the screw movement is continued and detection of the gradient of the pressure is continued.

Then, if it is determined that the absolute value of the gradient of the pressure is smaller than or equal to the reference value in step B4, the indicator indicating the completion of the pressure reduction is turned on (step B6) and the screw position at the time of the completion of the pressure reduction is stored as the pressure reduction completion position (step B7). Then, the screw movement amount from the suck back start position to the pressure reduction completion position is displayed on the screen (step B8) to finish the determination processing in FIG. 5.

Figure 6:
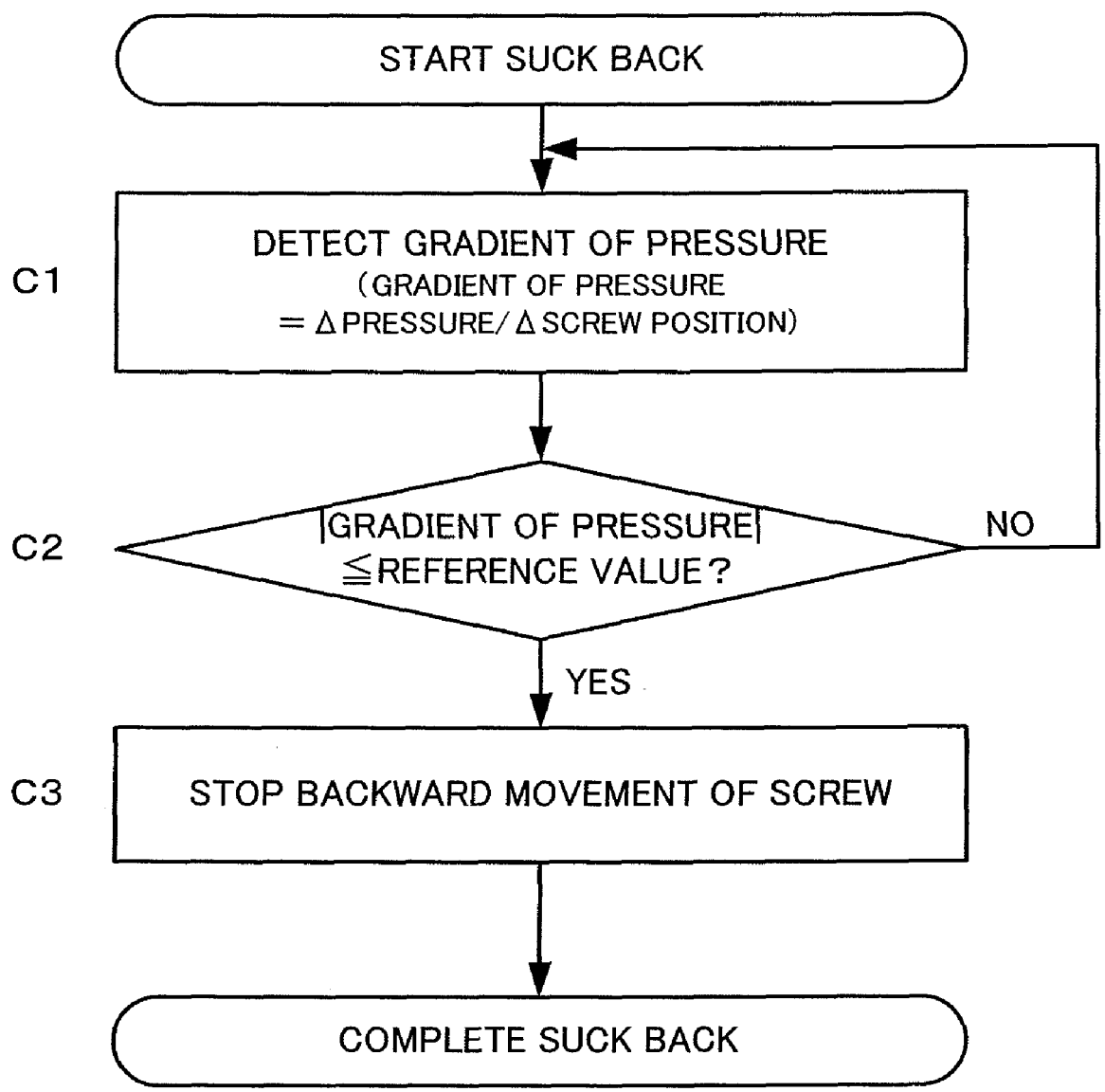
FIG. 6 is a flow chart of optimum suck back control based on Δ pressure/Δ screw position.

FIG. 6 is a flow chart showing an algorithm of optimum suck back control based on the gradient of the pressure ($\Delta$ pressure/$\Delta$ screw position).

When the suck back is started, the gradient of the pressure (=$\Delta$ pressure/$\Delta$ screw position) is detected from an amount of change in the pressure when the screw moves backward by a certain amount, an absolute value of the gradient of the pressure (|$\Delta$ pressure/$\Delta$ screw position|) is obtained (step C1), and whether or not the obtained absolute value of the gradient of the pressure is smaller than a value (reference value) set in advance is determined (step C2). If it is determined that the absolute value of the gradient of the pressure is not smaller than the reference value, the processing proceeds to step C1 to continue backward movement of the screw and continue detection of the gradient of the pressure. On the other hand, if it is determined that the absolute value of the gradient of the pressure is smaller than the reference value in step C2, backward movement of the screw is stopped (step C3) to complete the suck back.

Although the in-line type injection molding machine in which the suck back is carried out by moving the screw backward has been described as the embodiment of the present invention, the invention can be applied also to a pre-plasticization type injection molding machine in which the suck back is carried out by moving a plunger backward. The form in which the pressure reduction is carried out by rotating the screw can be applied to both the in-line type injection molding machine and the pre-plasticization type injection molding machine by replacing the screw movement amount with the screw reverse rotation amount in the above embodiment.

The invention claimed is:

1. An injection molding machine comprising: an axial driving means for driving a screw or a plunger in an axial direction, a position detecting means for detecting an axial position of the screw or the plunger, and a resin pressure detecting means for detecting resin pressure, the injection molding machine being configured for carrying out suck back control,
wherein the injection molding machine further includes:
a resin pressure gradient detecting means for detecting a gradient of resin pressure related to a change of the axial position of the screw or the plunger in the suck back control based on a position detection value from the position detecting means and a pressure detection value from the resin pressure detecting means; and
a pressure reduction completion determining means for determining a completion of reduction of the resin pressure by comparing an absolute value of the gradient of the resin pressure detected by the resin pressure gradient detecting means with a value set in advance.

2. The injection molding machine according to claim 1, further comprising:
a means for (i) obtaining a movement amount of the screw or the plunger between a point of time of a start of the suck back control and a point of time when the pressure reduction completion determining means determines the completion of the reduction of the resin pressure and for (ii) displaying the obtained movement amount on a screen.

3. The injection molding machine according to claim 1, wherein the injection molding machine is configured to carry out the suck back control for automatically moving the screw or the plunger backward until the pressure reduction completion determining means determines the completion of the reduction of the resin pressure.

4. An injection molding machine comprising: a rotational driving means for driving a screw to rotate, a rotation amount detecting means for detecting a reverse rotation amount of the screw, and a resin pressure detecting means for detecting resin pressure, the injection molding machine being configured for carrying out pressure reduction control by reverse rotation of the screw,
wherein the injection molding machine further includes:
a resin pressure gradient detecting means for detecting a gradient of resin pressure related to a change of the reverse rotation amount of the screw in the pressure reduction control based on a reverse rotation amount detection value from the rotation amount detecting means and a pressure detection value from the resin pressure detecting means; and
a pressure reduction completion determining means for determining a completion of reduction of the resin pressure by comparing an absolute value of the gradient of the resin pressure detected by the resin pressure gradient detecting means with a value set in advance.

5. The injection molding machine according to claim 4, further comprising:
a means for (i) obtaining the reverse rotation amount of the screw between a point of time of a start of the pressure reduction control and a point of time when the pressure reduction completion determining means determines the completion of the reduction of the resin pressure and for (ii) displaying the obtained reverse rotation amount on a screen.

6. The injection molding machine according to claim 4, wherein the injection molding machine is configured to carry out the pressure reduction control for automatically rotating the screw reversely until the pressure reduction completion determining means determines the completion of the reduction of the resin pressure.

* * * * *